United States Patent [19]

Hara

[11] Patent Number: 4,627,042
[45] Date of Patent: Dec. 2, 1986

[54] LOADING APPARATUS FOR A DISC

[75] Inventor: Nobuyuki Hara, Yokohama, Japan

[73] Assignee: Sony Corporation, Tokyo, Japan

[21] Appl. No.: 774,869

[22] Filed: Sep. 11, 1985

Related U.S. Application Data

[63] Continuation of Ser. No. 558,509, Dec. 6, 1983, abandoned.

[30] Foreign Application Priority Data

| Dec. 28, 1982 | [JP] | Japan | 57-229898 |
| Dec. 28, 1982 | [JP] | Japan | 57-229899 |
| Dec. 28, 1982 | [JP] | Japan | 57-229900 |
| Dec. 28, 1982 | [JP] | Japan | 57-229901 |

[51] Int. Cl.$^4$ .................. G11B 1/00; G11B 25/04; G11B 17/04
[52] U.S. Cl. ............................................. 369/77.1
[58] Field of Search .......................... 369/75.2, 77.1

[56] References Cited

U.S. PATENT DOCUMENTS

| 2,508,715 | 5/1950 | Harman | 369/77.1 |
| 3,802,710 | 4/1974 | Mazza | 369/77.1 |
| 4,278,258 | 7/1981 | Fujita et al. | 369/77.2 |
| 4,302,832 | 11/1981 | Cheeseboro | 369/77.1 |
| 4,347,596 | 8/1982 | Abe et al. | 369/75.2 |

FOREIGN PATENT DOCUMENTS

| 68025 | 6/1978 | Japan | 369/77.1 |
| 2088113 | 6/1982 | United Kingdom | 369/77.1 |

*Primary Examiner*—Steven L. Stephan
*Attorney, Agent, or Firm*—Lewis H. Eslinger; Alvin Sinderbrand

[57] ABSTRACT

A disk loading device has a slide base driven by a driving motor, a first rotary unit rotatably mounted on the slide base, a second rotary unit similarly rotatably mounted on the slide base, means for biasing said first and second rotary units into rotation, guide means mounted parallel to the sliding direction of the slide base and operable to regulate the rotation of said first and second rotary units against biasing of said biasing means and allowing for movement of said first and second rotary units that are moved as one with said slide base, disk position control means mounted to the slide base and at a position facing to said first and second rotary units, and disk transport means mounted to the slide base and operable to transport the disk in a direction prependicular to the sliding direction of the slide base, said first rotary unit being rotated against said biasing means by the joint operation of the disk insertion and the disk position control means and returned under the control of said guide means, said second rotary unit being also rotated against said biasing means by the joint operation of the disk insertion and the disk position control means and returned under the control of said guide means. The disk inserted into the loading device is loosely supported by said first and second rotary units and the disk position control means and transported with said slide base in the sliding direction of the slide base, after which the disk is transported by said transport means in a direction at right angles with said sliding direction so as to be mounted on the turntable.

9 Claims, 14 Drawing Figures

LOADING APPARATUS FOR A DISC

This is a continuation of application Ser. No. 558,509, filed Dec. 6, 1983 now abandoned.

BACKGROUND OF THE INVENTION

1. Field of Industrial Utilization

This invention relates to a loading device whereby an annular article such as optical, video or record disc is transported onto a turntable provided in a playback device such as disk player.

2. Background Art and Its Problems

In the optical disk player of the type making use of a laser beam for reading out information signal recorded on the optical disk, it has been customary to automate a series of disk loading operations consisting in withdrawing the disk into the player proper, transporting the disk onto a turntable and securely placing the disk on the turntable.

For loading the disk on the record player, a disk transfer table is mounted reciprocably in the player proper, whereby the disk can be transported onto the turntable. However, the overall size of the device tends to be increased due to provision of the transfer table in the player proper. In addition, it is not practicable to install the player proper in a narrow space because the disk loading and unloading operation need be performed with the disk transfer table drawn out of the player proper.

In addition, in the prior-art loading device, means for transferring the disk from the insertion opening to the turntable and means for securing the thus transferred disk on the turntable are driven by separate driving means, thus complicating the sequential operation of transferring and mounting the disk to the turntable.

STATEMENT OF OBJECTS

It is therefore an object of the present invention to provide a disk loading device whereby an annular article such as optical disk can be transported to a predetermined position as onto the turntable in the player proper without resorting to transfer means such as reciprocable disk transfer table.

It is a further object of the present invention to provide a transfer device for an annular article whereby the article can be transferred onto the turntable by simply pushing the article such as optical disk into the insertion opening in the player proper.

It is a further object of the present invention to provide a disk loading device which is small-sized, simple in structure and convenient to operate and by means of which the annular article such as optical disk can be transferred in two mutually perpendicular directions by one and the same driving means.

It is a further object of the present invention to provide a disk loading device by means of which the disk inserted into the player proper can be held positively and loaded to the playback position or ejected safely and reliably.

It is another object of the present invention to provide a disk loading device capable of positively preventing the insertion of articles other than the disk of the predetermined size or format.

EMBODIMENT

The present invention is hereinafter described by referring to the optical disk player in which a laser beam is directed to a signal recording surface of the optical disk for reading out and reproducing the information signal recorded on the disk.

Figure 1:
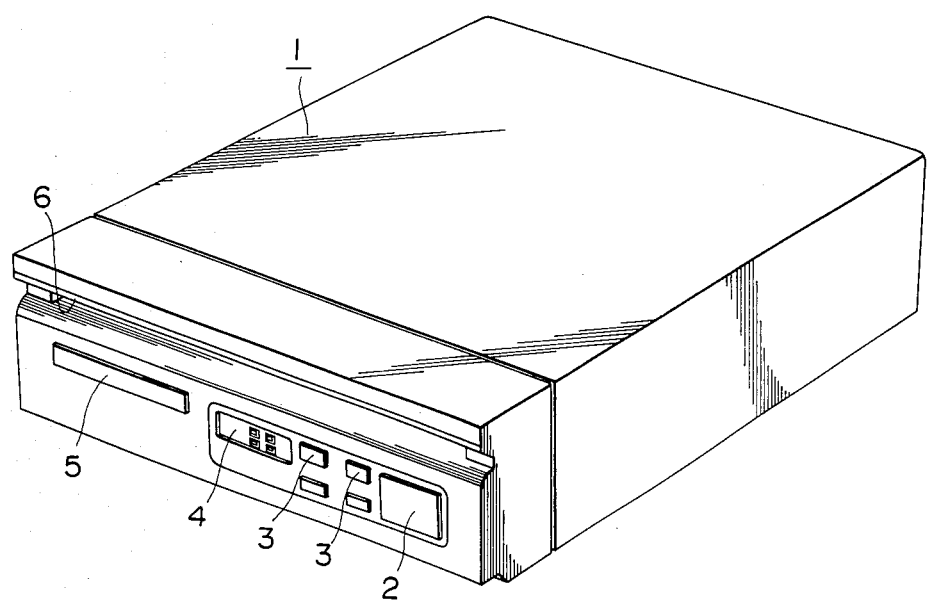
FIG. 1 is a perspective view showing the overall optical disk player incorporating the disk loading device of the present invention.

Reference is made to FIG. 1 showing in an overall perspective view the optical disk player to which the present invention is applied. A disk player proper 1 has a front side panel having in turn a playback start-stop button 2, a tune select button 3, a tune number and time display 4, an eject button 5, and a disk insertion opening 6 through which an optical disk 20 is inserted for mounting and playback in the player proper.

Figure 2:
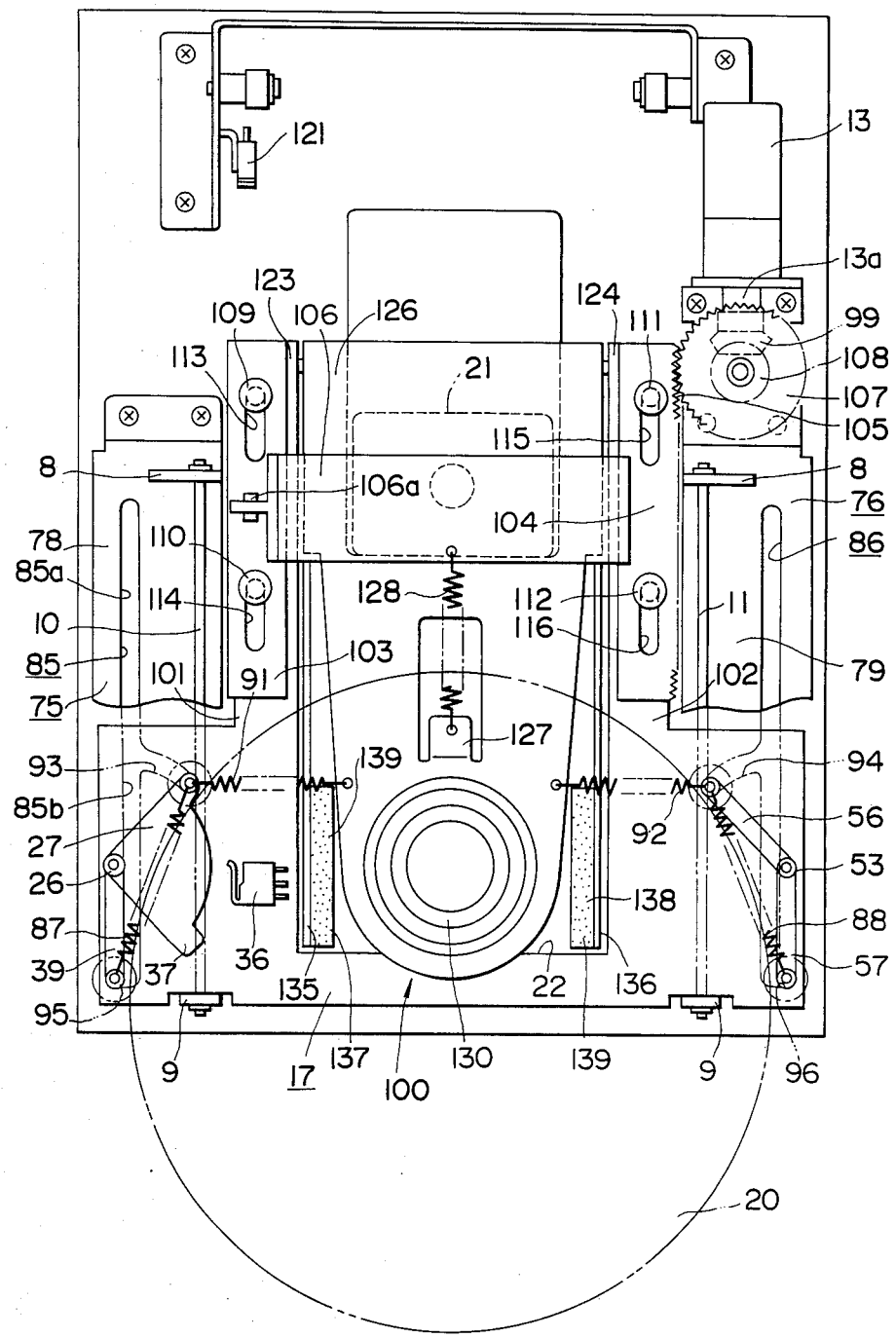
FIG. 2 is a plan view showing the disk loading devide with an optical disk inserted halfway into the device.
Figure 3:
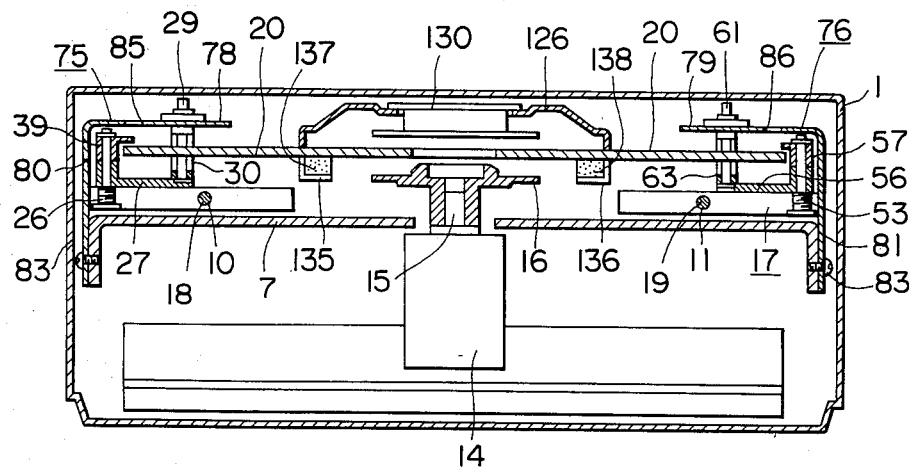
FIG. 3 is a front sectional view of the disk loading device.

The loading device of the present invention is mounted in the player proper 1 of the disk player and has a disk inserting unit 100 for insertion through the disk insertion opening 6. The loading device has a slide base 17 slidably mounted on a pair of parallel guide shafts 10, 11 provided to both sides of a chassis base plate 7 mounted in the player proper 1. The guide shafts are carried by a pair of upright supporting projections 8, 9 formed by partially cutting out the base plate 7 (FIGS. 2 and 3). The slide base 17 may be driven by an electric motor 13 used as driving source from the insertion opening 6 towards a turntable 16. During this time, the slide base is guided by guide shafts 10, 11. The turntable 16 may be driven in rotation as one with a spindle 15 which in turn is driven in rotation by a spindle motor 14 mounted in the disk player proper 1. The slide base 17 is formed as a flat disk having parallel through-holes 18, 19 through which it is slidably supported by the guide shafts 10, 11. A center cut-out 22 is provided in the slide base 17, into which may be introduced an optical pickup unit 21 designed for radiating a laser beam to the turntable 16 and to an optical disk 20 on the turntable 16 when the slide base has been shifted to the turntable 16.

Figure 5:
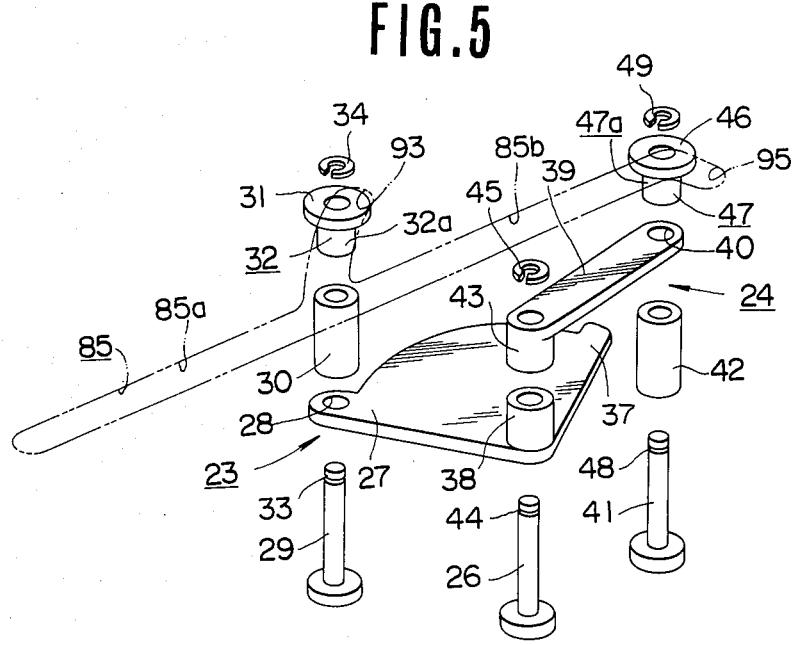
FIG. 5 is an exploded perspective view showing a first rotary unit and a second rotary unit as part of the disk loading device.

A first rotary unit 23 and a second rotary unit 24 are rotatably supported by one edge of the slide base 17 for loosely supporting the inserted disk 20 in cooperation with disk position regulating means as later described. As shown in FIG. 5, the first rotary unit 23 is comprized of a substantially sector-shaped first rotary arm 27 and a cylindrical member 30 rotatably fitted over a support shaft 29 passed in a through-hole 28 in the first rotary arm 27. As shown in FIG. 5, the rotary arm 27 mounted for rotation about a supporting shaft 26 mounted on the slide base 17 and passed through a through-hole 25 in the rotary arm 27. The member 30 is supported by a cylindrical holder 32 having a flange 31, and mounted to the supporting shaft 29 along with the holder 32 by having an E-ring 34 fitted to a mating groove 33 in the end of the supporting shaft 29. The first rotary arm 27 of the first unit 23 is also formed with a switch operating end 37 adapted to be introduced into a through-hole 35 provided to one side of the slide base 17 and to operate a first changeover switch 36 of an electric motor 13 mounted in turn to and adapted for actuating the slide base 17.

The second rotary unit 24 is comprized of a second rotary arm 39 and a cylindrical member 42 passed rotatably over a supporting shaft 41 which is also passed in a through-hole 40 in the rotary arm 39. The supporting shaft 26 is passed through a spacer 38 and a cylindrical extension 43 of the second rotary arm 39 axially aligned with the spacer 38, so that the second rotary arm 39 is maintained at a predetermined height above the surface of the first rotary arm 27 and supported for rotation by said supporting shaft 26 by having an E-ring 45 fitted to a mating groove 44 in the supporting shaft 26. The cylindrical member 42 is passed over the supporting shaft 41 so as to be disposed below the second rotary arm 39. The member 42 is supported by a cylindrical holder 47 which is provided with a flange 46 and through which is passed the supporting shaft 41 which is projected via through-hole 40 in the second rotary arm 39 above the upper surface of the second rotary arm 39. The member 42 is mounted to the supporting shaft 41 for clamping the second rotary arm 39 in cooperation with the holder 47 by having an E-ring 49 engaged in a mating recess 48 in the end of the supporting shaft 41. The member 41 is mounted in this manner to the second rotary arm 39 so as to be at the same mounting level as that of the cylindrical member 30 mounted to the first rotary arm 27 and the upper surface of the slide base 17.

Figure 6:
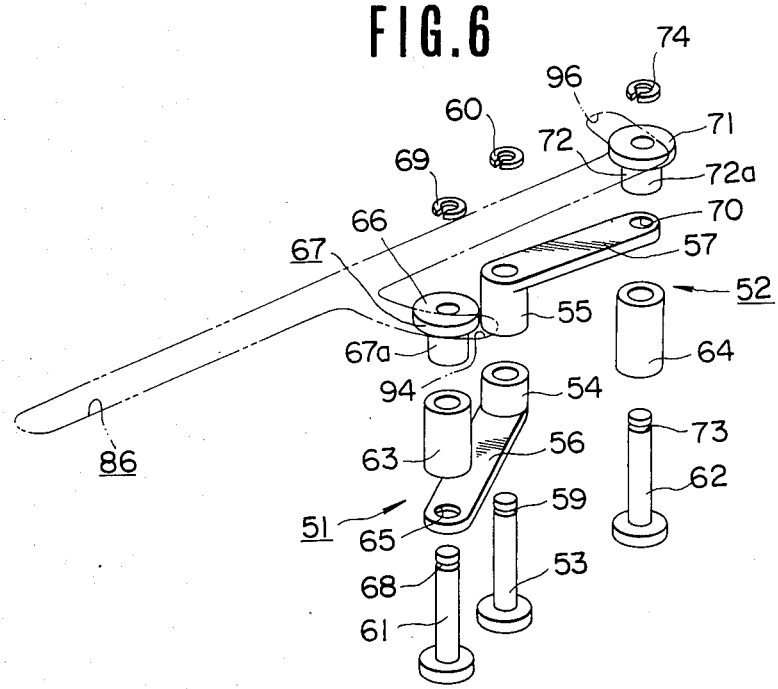
FIG. 6 is an exploded perspective view showing a third rotary unit and a fourth rotary unit as part of the disk loading device.

To the opposite side of the slide base 17, there are mounted a third rotary unit 51 and a fourth rotary unit 52 opposed to said first and second rotary units 23, 24 and making up position control means adapted for loosely supporting the inserted optical disk 20 in cooperation with the first and second units 23, 24. As shown in FIG. 6, the third and fourth rotary units 51, 52 are provided with a third rotary arm 56 and a fourth rotary arm 57, respectively, associated with cylindrical extensions 54, 55 for insertion of a supporting shaft 53, respectively. These rotary arms 56, 57 are placed so that the extensions 54, 55 are stacked one upon the other and the supporting shaft 53 introduced in a through-hole 58 in the slide base 17 and thus secured upright on the slide base 17 may be passed through the hollow inside of the extensions 54, 55. The rotary arms are mounted for rotation to the supporting shaft 53 by having an E-ring 60 fitted about a mating groove 59 formed in the foremost part of the supporting shaft 53. A pair of cylindrical members 63, 64 are rotatably mounted via supporting shafts 61, 62 to the foremost parts of the third and fourth rotary arms 56, 57. The cylindrical member 63 attached to the third rotary arm 56 is passed over the supporting shaft 61 so as to be disposed on the upper surface of the third rotary arm 56, said shaft 61 being in turn passed in a through-hole 65 of the third rotary arm 56, starting from the lower side of the arm 56. The member 63 is supported by a cylindrical cap or holder 67 having a flange 66 passed over the supporting shaft 61, and is mounted on the supporting shaft 61 along with the holder 67 by having an E-ring 69 engaged in a mating groove 68 provided to the foremost part of the supporting shaft 61. The cylindrical member 64 mounted to the fourth rotary arm 57 is passed over the supporting shaft 62 so as to be disposed below the lower surface of the rotary arm 57. A cylindrical cap or holder 72 having a flange 71 is extended via a through-hole 70 in the foremost part of the rotary arm 57 above the upper surface of the arm 57 for supporting the member 64. An E-ring 74 is engaged in a mating groove 73 in the foremost part of the supporting shaft 62 for mounting the member 64 to the supporting shaft 62, said member 64 clamping the fourth rotary arm 57 between it and the cap 72. The cylindrical members 63, 64 are mounted to the third and fourth rotary arms 56, 57 so as to be at the same mounting height relative to the upper surface of the slide base 17.

It should be noted that the supporting shaft 26 mounted on the slide base 17 for supporting the first and second rotary members 23, 24 and the supporting shaft 53 equally mounted on the slide base 17 for supporting the third and fourth rotary members 51, 52 are disposed on both sides of the slide base 17 on a straight line extending perpendicular to the sliding direction of the slide base 17, and that the distance between the supporting shaft 26 for the first and second rotary arms 27, 39 and the supporting shaft 29 is equal to the distance between the supporting shaft 53 for the third and fourth rotary arms and the supporting shaft 61, while the distance between the supporting shafts 26 and 41 is equal to that between the shafts 53 and 62.

To the opposite sides of the chassis base plate 17, there are mounted a pair of guide units 75, 76 comprized of metallic sheet.s of L-shaped cross-section and adapted for regulating the direction and range of the movement of the first and second rotary members 23, 24 and those of the third and fourth rotary members 51, 52 moved with the slide base 17. These guide members 75, 76 are formed by horizontal sections 78, 79 extending on the guide rods 10, 11 adapted for supporting the slide base 17, and upright sections 80, 81 secured to the base plate 7 by screws 83 attached to the sides of the base plate 7. A pair of guide grooves 85, 86 are formed in the horizontal sections 78, 79 of the guide members 75, 76 for extending parallel to the sliding direction of the slide base 17. In the guide groove 85 formed in the horizontal section 78 of the guide unit 75, there are engaged cylindrical sections 32a, 47a of the holders 32, 47 supporting the cylindrical members 30, 42, that are supported by the supporting shafts 29, 41 mounted upright on the first and second rotary arms 27, 39 of the first and second rotary units 23, 24 as described above. In the guide groove 86 formed in the horizontal section 79 of the other guide member 76, there are engaged cylindrical sections 67a, 72a of holders 67, 72 supporting the cylindrical members 63, 64 supported by the supporting shafts 61, 62 that are mounted upright on the foremost parts of the third and fourth rotary arms 56, 57 of the third and fourth rotary units 51, 52.

A tension spring 87 is mounted between the ends of the supporting shafts 29, 41 mounted to the ends of the first and second rotary arms 27, 39 of the first and second rotary units 23, 24 engaged by the holders 32, 47 in the guide groove 85 of the guide member 75, as described above, and acts as means for biasing the first and second rotary arms 27, 39 into rotation in a direction to approach towards each other. Similarly, a tension spring 88 is mounted between the ends of the supporting shafts 61, 62 mounted to the ends of the third and fourth rotary arms 56, 57 of the third and fourth rotary units 51, 52 engaged by the holders 67, 72 in the guide groove 86 of the other guide member 76, and acts as means for biasing the third and fourth rotary arms 56, 57 into rotation in a direction to approach towards each other.

The guide grooves 85, 86 formed in the guide units 75, 76 are provided at positions in the slide base 17 offset more inwardly than the common supporting shaft 26 for the first and second rotary arms 27, 39 or the common supporting shaft 53 for the third and fourth rotary arms 56, 57 towards the disk placed on the slide base 17. Thus the first and second rotary arms 27, 39 and the third and fourth rotary arms 56, 57 are biased by the tension springs 87, 88 in a direction to approach towards each other and towards the disk placed on the slide base. Thus the cap members 32, 47, 67, 72 associated with the supporting shafts 29, 41, 61, 62 are pressured against the inner sides of the guide grooves 85, 86. Thus the guide grooves 85, 86 act for regulating the rotation against the bias of the tension springs 87, 88 associated with the first and second rotary arms 27, 39 and with the third and fourth rotary arms 56, 57, respectively. The first and second rotary arms 27, 39 mounted via supporting shaft 26 mounted upright on the slide base 17 and the third and fourth rotary arms 56, 57 similarly mounted via supporting shaft 53 mounted upright on the slide base 17 are caused to follow the sliding movement of the slide base 17 and be guided by the guide grooves 85, 88 in a direction parallel to the sliding direction of the slide base 17 over the extent of the guide grooves 85, 86.

It should be noted that, in the disk mounting state shown in FIG. 2 in which the slide base 17 is positioned at the disk inserting opening 6 of the disk player proper 1 and in the disk ejecting state in which the disk 20 placed on the turntable is ejected, the first and third rotary arms 27, 57 are rotated under the force of tension springs 87, 88 and disk discharge springs 91, 92 and thereby brought towards each other so that the distance therebetween becomes lesser than the diameter of the optical disk 20. A pair of arcuate rotation guide grooves 93, 94 are formed at about the center of the guide grooves 85, 86 so that the supporting shafts 29, 61 associated with the first and third rotary arms 27, 57 may be introduced into these rotation guide grooves. These rotary guide grooves 93, 94 are curved towards the disk inserting unit 100 which is situated at the forward side of the slide base 17. The foremost ends of the guide grooves 85, 86 are contiguous to clearance grooves 95, 96 into which are respectively engaged supporting shafts 41, 62 mounted at the front sides of the second and fourth rotary arms 39, 57 that are pressed by the disk 20 and thereby turned laterally of the slide base 17 against the operation of the tension springs 87, 88. In this manner, the distance between these supporting shafts 41, 62 at the end parts of the opposite second and fourth arms 39, 57 becomes slightly larger than the diameter of the optical disk 20 during insertion or ejection of the optical disk 20.

The forward side corners of the slide base 17 are formed with steps 97, 98 for engaging with base ends of the supporting shafts 41, 62 in order that the second and fourth rotary arms 39, 57 moved with the slide base 17 and getting to said guide grooves 93, 94 contiguous to the guide grooves 85, 86 are not received within these guide grooves 93, 94.

The guide groove 85 adapted for guiding the first and second rotary arms 27, 39 provided to the first guide unit 75 is hereinafter described in detail. The guide groove 85 represents first and second guide means limiting the rotation of the first and second guide arms 27, 39. These first and second guide means are formed as one continuous groove. A second rotation guide groove 93 acting as first groove allowing for rotation of the first rotary arm 29 when inserting the disk 20 is provided halfway in the guide groove 85 so as to be contiguous thereto and curved towards the disk inserting unit 10 as mentioned hereinabove. The inner portion of the guide groove 85 contiguous to the guide groove 93 is a second groove 85a inhibiting the first rotary arm 27 from rotation during sliding of the slide base 17 and causing the rotary arm 27 to be moved in the same direction as the direction in which the slide base 17 is moved. The clearance groove 95 contiguous to the foremost part of the guide groove 85 represents the third groove allowing for sidewise clearance of the second rotary arm 39 during insertion of the optical disk 20. The groove connecting the clearance groove 95 of the first guide groove 85 to the second groove 85a represents a fourth groove 95 inhibiting rotation of the second rotary arm 39 and causing said second arm 39 to be moved in the same direction as the direction in which the slide base 17 is moved.

The other guide groove 86 adapted for guiding the third and fourth rotary members 51, 52 during sliding of the slide base 17 is similar to the aforementioned guide groove 85 and hence is not described herein for simplicity.

The rear side of the slide base 17 provided with the first and second rotary members 23, 24 and the third and fourth rotary members 51, 52, or the side directed to the inner side of the player proper 1, is formed with a pair of leg pieces 101, 102 extending towards the inner side of the player proper 1. These leg pieces 101, 102 are extended parallel to the through-holes 18, 19 receiving the guide shafts 10, 11, and are spaced apart from each other a distance sufficient to receive the turntable 16 and the optical pickup unit 21.

Figure 7:
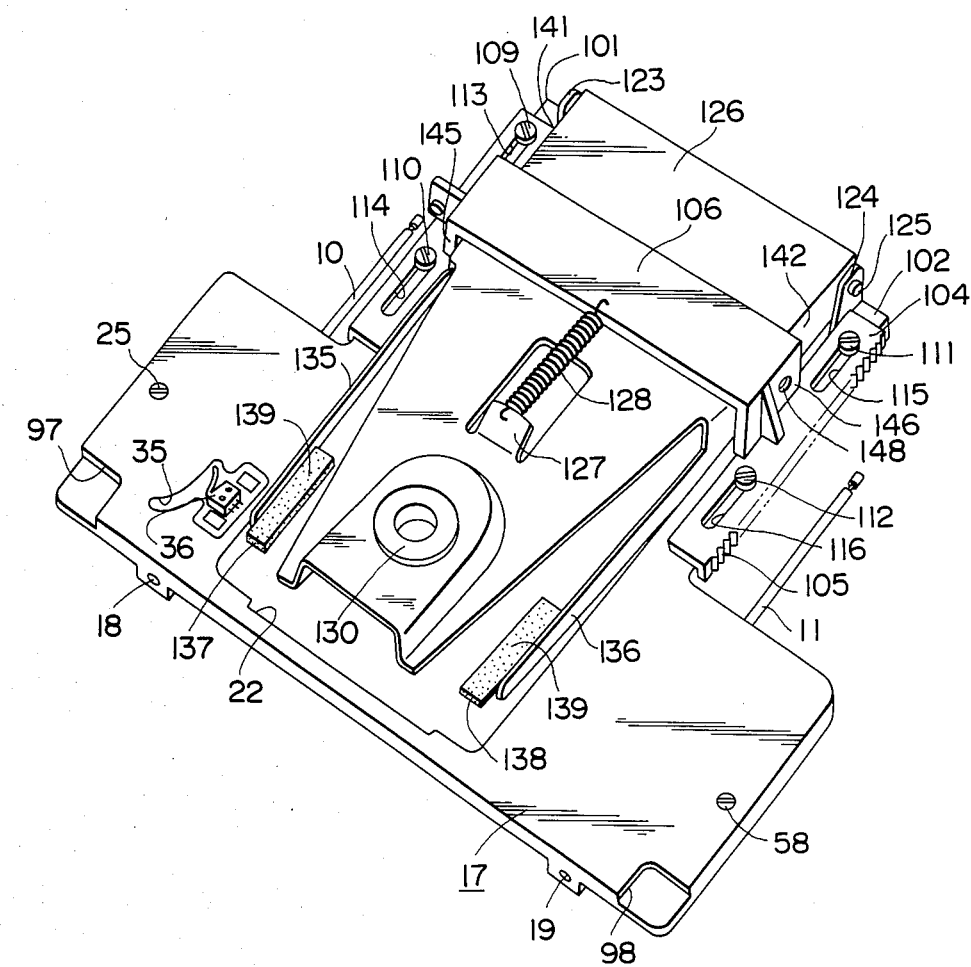
FIG. 7 is a perspective view showing a slide base and a chuck plate as part of the disk loading device.

A pair of slide plates 103, 104 integrally formed with a U-shaped connecting member 106 are superimposed on the leg pieces 101, 102, as shown in FIG. 7. A tooth rack 105 is formed along side edge of one of the slide plates 104. A gear 107 meshes with the rack 107 for constituting a transmission system transmitting the torque of the driving electric motor 13 for causing the slide base 17 to slide along guide rods 10, 11 (FIG. 2).

The transmission system is made up of a bevel gear 108 coaxial with the gear 107 meshing with the tooth rack 105 and a second bevel gear 99 mounted to a driving shaft 13a of the driving electric motor 13. The driving motor 13 is housed in a minimum space within the player proper 1 with the driving shaft 13a thereof extending parallel to the sliding direction of the slide base 17.

The slide plates 103, 104 are mounted over the leg pieces 101, 102 by stationary pins 109, 110, 111, 112 on the leg pieces 101, 102 engaging in elongated through-holes 113, 114, 115, 116 in the slide plates having their long axes in the sliding direction of the slide base 17 so that the plates 103, 104 may be slid on the leg pieces within a stroke equal to the length of the oblong holes 113 to 116. A through-hole 117 is bored in each of the leg pieces 101, 102 about midway of the zone covered by the slide plates 103, 104. A slide ball 118 having a diameter larger than the thickness of the leg piece 101 or 102 is disposed in each through-hole 117 and pressedly held by the slide plates 103, 104 and by the chassis base plate 7 supporting the leg pieces 101, 102. The chassis base plate 7 has a pair of semi-circular recesses 119 for receiving the slide balls 118 when the slide base 17 has slid to the innermost side of the player proper 1. The slide plates 103, 104 are also provided with semi-circular recesses 120 for receiving the slide balls 118 when the slide plates 103, 104 are located on the leg pieces 101, 102 at the most forward side of the slide base 17, that is, when the stationary pins 109, 110, 111, 112 are abutted on the rearmost edges of each of the elongated slots 113, 114, 115, 116. Thus, when the slide base 17 is disposed at the most forward side of the player proper 1 or at the disk inserting side 6, and the slide balls 18 are not received in the recesses 119 in the base plate 7, the steel balls 118 are clamped between the leg pieces 101, 102 and the slide plates 103, 104, which are then driven by the driving motor 13 and slid as one with the slide base 17. As the slide base 17 has reached the innermost side of the player proper 1 so that the slide balls 118 are received in the mating recesses 119 in the base plate 7 and disengaged from the recesses 120 in the slide plates 103, 104, only the slide plates 103, 104 are slid on the leg pieces 101, 102 so as to be movable further into the inside of the player proper 1.

A second changeover switch 121 is provided on the chassis base plate 7 towards the inner side of the player proper 1 and operates so that an operating element is disposed in opposition to an operating boss 106a provided to the connecting member 106 connecting the slide plates 103, 104 for stopping the operation of the driving motor 13. When only the slide plates 103, 104 are slid further towards the inner side of the player proper 1 and get to the innermost position, the switch 121 is changed over by the operating boss 106a of the connecting member 106 for stopping the operation of the motor 13.

Figure 4:
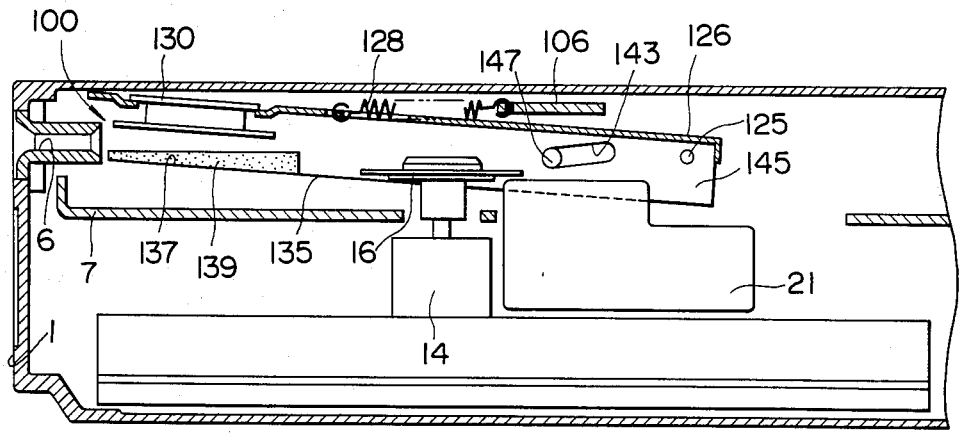
FIG. 4 is a side elevational view of the disk loading device.

A pair of upright elements 123, 124 are provided to the rear edges of a pair of leg pieces 101, 102 mounted as one with the slide base 17 and a chuck plate 126 is mounted for free rotation about a rotary shaft 125 mounted between these upright elements 123, 124. This chuck plate 126 is carried by the shaft 125 as indicated in FIG. 4. The chuck plate 126 is mounted below the lower surface of the U-shaped connecting member 106 interconnecting the slide plates 103, 104 and extends from the region intermediate the leg pieces 101 and 102 to the region of the cut-out 22 in the slide base 17. The chuck plate is normally biased towards the side of the connecting member 106 or to the upper side in FIG. 2 under the effect of a tension spring 128 installed between the connecting member 106 and an integral center projection 127.

Figure 14:
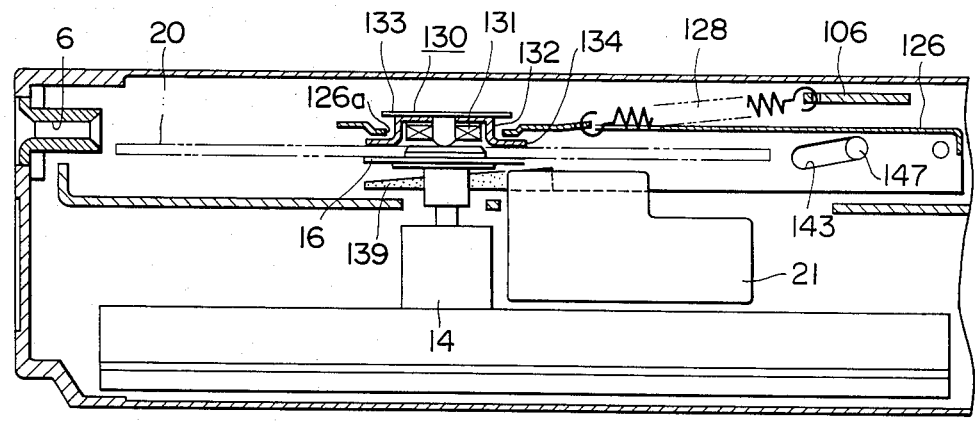
FIG. 14 is a side elevation of the disk loading device showing the disk mounted on the turntable.

Towards the front side of the chuck plate 126, there is provided a disk clamp unit 130 adapted to clamp the disk 20 on the turntable 16 in cooperation with the turntable 16. As shown in FIG. 14, the disk clamp unit 130 is so constructed and arranged that a holder section 132 having an enclosed magnet 131 is loosely fitted in a through-hole 126a in the chuck plate 126 and prevented from extrication by a pair of flanges 133, 134 provided to both ends of the holder section 132, while the section 132 is slightly movable in the thrust direction and radial direction with respect to the chuck plate 126. In this manner, the disk 20 positioned on the turntable 16 may be clamped in a manner free from positioning error.

On both sides of the chuck plate 126, there are provided a pair of disk supporting arms 135, 136 each having an L-shaped cross-section. Towards the front side of the disk supporting arms 135, 136, disk supporting members 137, 138 are mounted horizontally in opposition to the disk clamp unit 130 and provided with felt protective members 139 having inclined supporting surfaces for preventing damage to the disk 20.

The chuck plate 126 has side walls 141, 142 at the inner end, and a pair of inclined slots 143, 144 providing cam surfaces are formed in these side walls. As shown in FIG. 4, a pair of guide pins 147, 148 mounted to upright portions 145, 146 of the connecting member 106 are engaged in these slots 143, 144, that are inclined with a downward gradient from the base to the front sides of the chuck plate 126. When the slide plates 103, 104 are detached from leg pieces 101, 102 of the slide base 17 and slid towards the inner side of the player proper 1, the guide pins 147, 148 shifted as one with the slide plates are also moved towards the inner side of the player proper 1 and slid into the inclined slots 143, 144. Thus the chuck plate 126 is turned towards the turntable 16 about shaft 125 against the force of tension spring 128 so that at least the disk supporting members 137, 138 of the disk supporting arms 135, 136 are disposed below the turntable 16 and the disk 20 placed on the members 137, 138 is placed on the turntable 16, while the disk clamp unit 130 is pressed against turntable 16.

The sequence of operations for mounting the disk 20 on the aforementiohed disk player and ejecting the thus mounted disk is hereinafter described.

In mounting the disk 20, eject button 5 on the front surface of the player proper 1 is pressed for reversing the operation of the driving motor 13, so that the slide base 17 is moved to a forward position proximate to the disk insertion opening 6, as shown in FIGS. 2 and 4. With the slide base 17 thus shifted to the forward position of the player proper 1, the foremost part of the first rotary arm 27 of the first rotary unit 23 and that of the third rotary arm 56 of the third rotary unit 51 are placed for register with rotation guide grooves 93, 94, as shown in FIG. 2, so that the supporting shafts 29, 61 are withdrawn into the rotation guide grooves 93, 94 under the tension of the tension springs 87, 88 and the disk eject springs 91, 92. The second rotary arm 39 of the second rotary unit 24 and the fourth rotary arm 57 are situated in the guide grooves 85, 86 and the end supporting shafts 41, 62 are disposed at the forward ends of these guide grooves 85, 86.

The disk 20 is then introduced through disk insertion opening 6 of disk player proper 1 into the disk insertion unit 100 so as to be placed on the disk supporting members 137, 138 of the chuck plate 126. The second and fourth rotary arms 39, 57, whose supporting shafts 41, 62 are positioned at the forward ends of the guide grooves 85, 86 in turn mounted parallel to each other with a spacing lesser than the diameter of the disk 20, are rotated into clearance grooves 95, 96 against the force of tension springs 87, 88, until the center aperture 20a of the disk 20 is moved beyond a straight line interconnecting the supporting shafts 41, 62. As the disk 20 is inserted further and the center aperture of the disk has been shifted beyond the straight line interconnecting the the supporting shafts 41, 62, the second and fourth rotary arms 39, 57 are restored into the guide grooves 85, 86 under the force of the tension springs 87, 88 for abuttingly supporting the outer rim of the disk 20.

The first and third rotary arms 27, 56, whose supporting shafts 29, 61 are pulled into the rotation guide grooves 93, 94 so that the spacing therebetween is lesser than the diameter of the disk 20 inserted into the disk player proper, are rotated along the rotation guide grooves 93, 94 by the disk 20 against the force of the tension springs 87, 88 and the disk eject springs 91, 92 until the supporting shafts 29, 61 are introduced into guide grooves 85, 86. This rotation of the first and third rotary arms occurs simultaneously with the aforementioned rotation of the second and fourth rotary arms 39, 57.

It should be noted that, since the first and third rotary arms 27, 56 are guided by a pair of guide grooves 85, 86 spaced apart from each other a distance lesser than the diameter of the optical disk 20, the distance between these first and third rotary arms 27, 56 is not extended to larger than the maximum diameter of the disk 20. In this manner, the disk can be prevented from being inserted excessively into the player proper.

Figure 9:
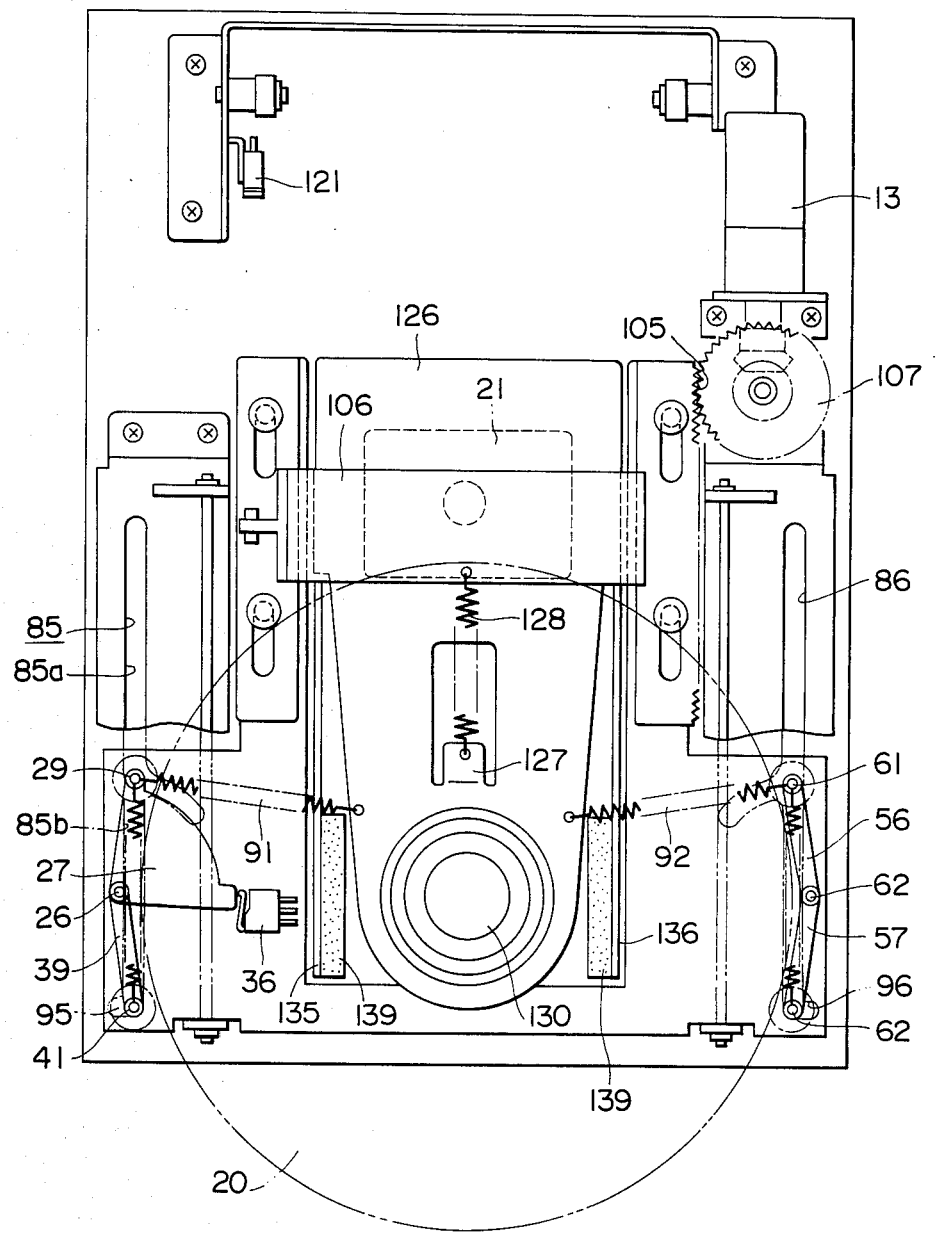
FIG. 9 is a plan view of the loading device showing the disk inserted and supported on the rotary arms.

When the disk 20 has been inserted until the center aperture 20a thereof is positioned at the center of the disk clamp unit 130, the first to fourth rotary arms 27, 39, 57, 56 being rotated into the guide grooves 85, 86 under the effect of insertion of the disk 20, the disk 20 is loosely supported at the center at four points, that is, the supporting shafts 29, 41, 61, 62 of the first to fourth rotary arms 27, 39, 56, 57, as indicated in FIG. 9.

Figure 8:
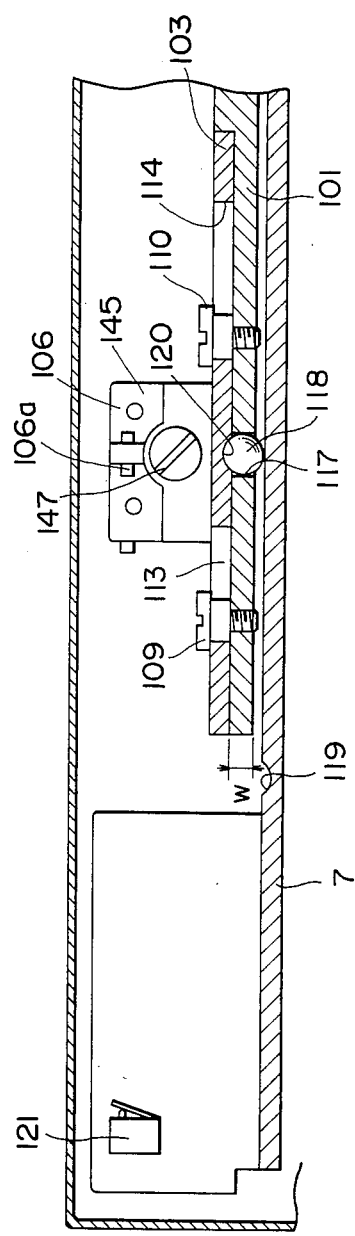
FIG. 8 is a sectional view showing a coupling mechanism coupling the slide base and the chuck plate to each other.
Figure 10:
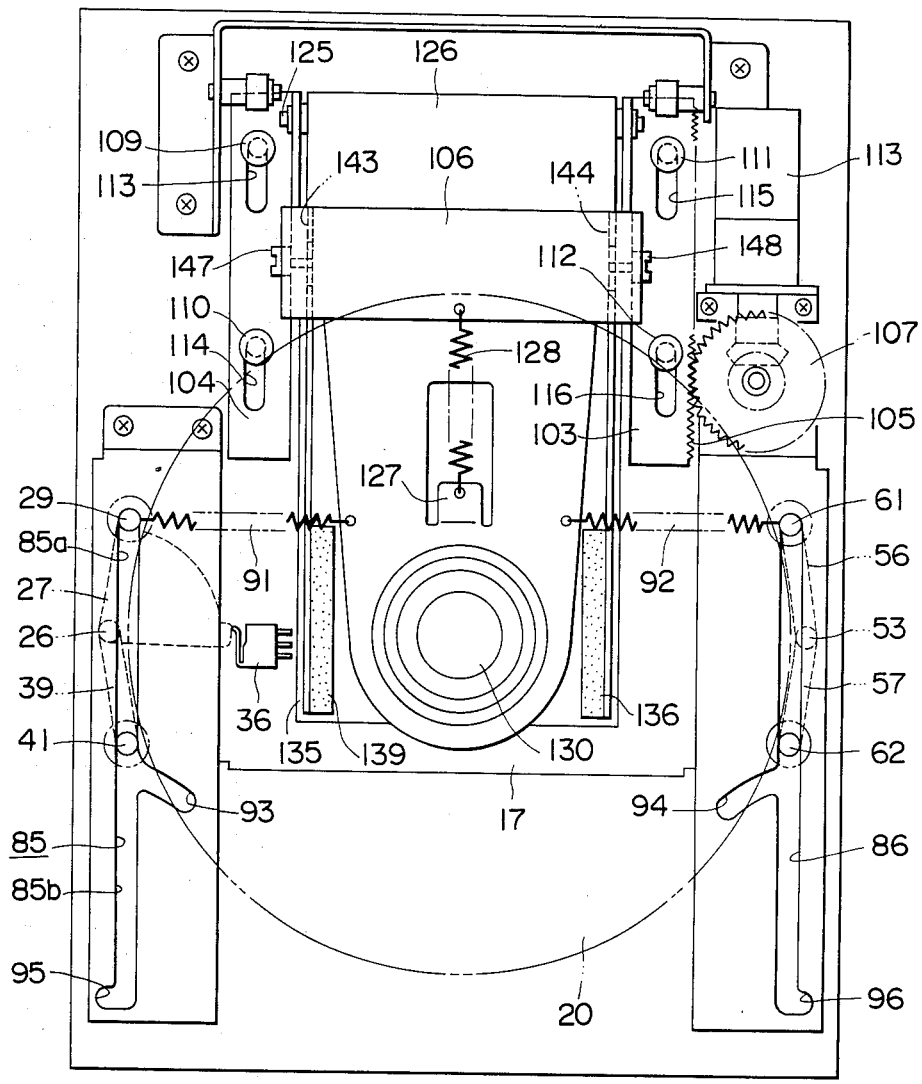
FIG. 10 is a plan view of the loading device showing the disk transferred onto the turntable.
Figure 11:
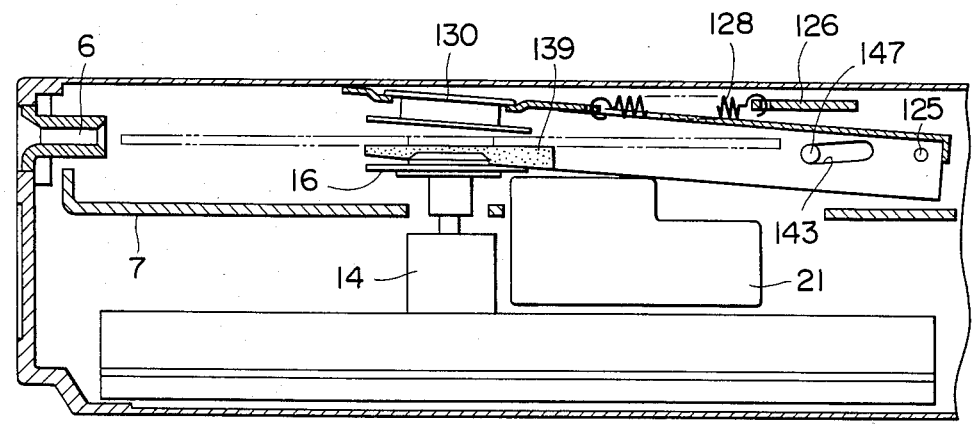
FIG. 11 is a side elevational view of the loading device showing the disk transferred onto the turntable.

When the sector-shaped first rotary arm 27 has been rotated in the aforementioned manner by insertion of disk 20, the first changeover switch 36 is activated by switch actuating member 37 provided to the end of the arcuate section of the rotary arm 27 so that the driving motor 13 is driven in the normal direction. With the driving motor 13 thus driven in the normal direction, the slide base 17 is transferred along guide shafts 10, 11 into the inside of the disk player proper 1. Thus the disk 20 loosely supported on the slide base 17 by the rotary arms 27, 29, 56, 57 is also transferred towards the inner side of the disk player proper along with slide base 17. The latter is transferred to the inner zone of the player proper 1 until the center aperture 20a of the disk 20 loosely supported on the slide base is positioned for register with the turntable 16 in the disk player proper 1 (FIGS. 10 and 11). The first to fourth rotary arms 27, 39, 56, 57 loosely supporting the disk 20 are moved at this time along guide grooves 86, 87 parallel to the sliding direction of the slide base 17. During sliding movement of the disk 20 with the slide base 17 from the front side of the player proper 1 to the turntable 16, the slide balls 18 are disposed on the chassis base plate 7 and are not engaged in the recesses 119 of the base plate 7, as shown in FIG. 8. Thus the slide balls 118 are pressured by the leg pieces 101, 102 and the slide plates 103, 104, with the slide plates 103, 104 making a sliding movement as one with slide base 17.

Figure 12:
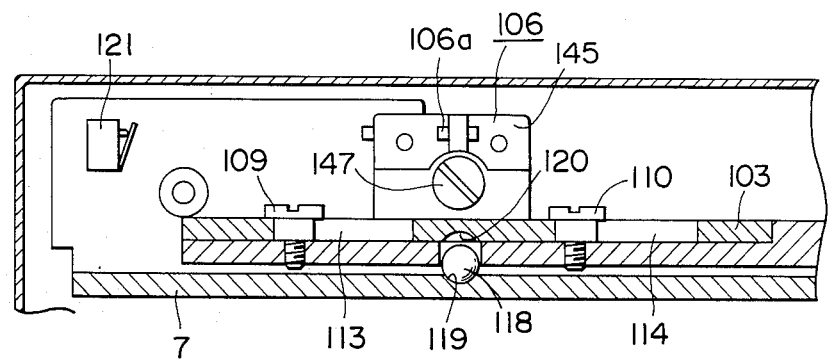
FIG. 12 is a sectional view showing the slide plate and the associated leg piece and showing the state in which the slide ball has dropped into the mating recess in the chassis base plate and only the slide plate is slidable.
Figure 13:
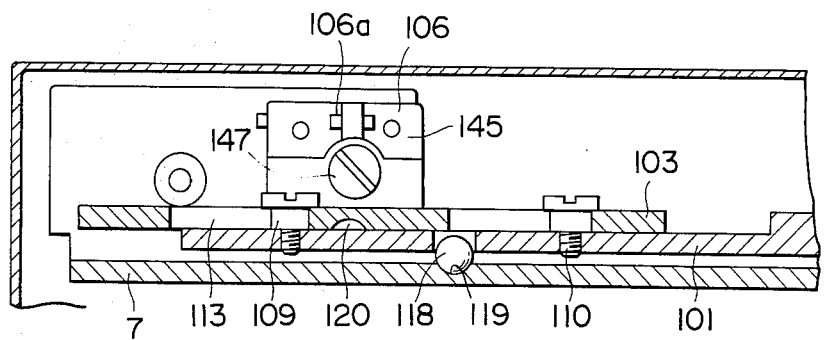
FIG. 13 is a sectional view showing the slide plate and the leg piece and showing the state in which only the slide plate has slid to the innermost side of the player proper.

When the slide base 17 has been shifted in this manner until the center aperture 20a of the disk 20 is registered with turntable 16, as mentioned hereinabove, the slide balls 118 are engaged in the recesses 119 of the chassis base plate 7 (FIG. 12). Thus, only the slide plates 103, 104 are slid on leg pieces 101, 102 and shifted further into the inner zone of the player proper 1, as shown in FIG. 13. When only the slide plates 103, 104 are slid in this manner, the guide pins 147, 148 introduced through projections 145, 146 of the connecting member 106 interconnecting these slide plates 103, 104 are slid in the inclined slots 143, 144 in the chuck plate 126 so that the plate 126 is turned about shaft 125 in the direction of the turntable 16 against the force of tension spring 128. The disk supporting members 137, 138 of the disk supporting arms 135, 136 are brought to a position below the turntable 16 and the disk 20 placed on these supporting members 137, 138 is shifted in a direction perpendicular to the sliding direction of the slide base 17 and placed on the turntable 16. Simultaneously, the disk clamp unit 130 is brought to a disk clamp position and the disk 20 is centered and clamped on the turntable 16 as shown in FIG. 14. When the slide plates 103, 104 have been shifted to the innermost position in the player proper 1, the changeover switch 121 is switched by the slide plate 103 so that the operation of the motor 13 ceases to complete the clamping of the disk 20 to the player proper 1. Then, on pressing the playback start/stop button 2, the turntable 16 and the optical pickup unit 16 start their operation for starting the playback operation of the disk 20.

The eject operation for taking out the disk 20 out of the player 1 upon completion of playback is hereinafter explained.

For taking out the disk 20 out of the player proper 1, the eject button 5 is pressed for driving the motor 13 in reverse. Since the slide balls 118 are engaged at this time in the recess 119 of the chassis base plate 7, only the slide plates 103, 104 are slid on the leg pieces 101, 102 towards the front side of the player proper 1 until the slide balls 118 are engaged in the recesses 120 of the slide plates 103, 104. During sliding only of the slide plates 103, 104, the guide pins 147, 148 passed through the projections 145, 146 of the connecting member 106 are also moved in the inclined slots 143, 144 in the chuck plate 126 towards the front side of the player proper 1 along with the slide plates 103, 104. The chuck plate 126 is turned above turntable 16 about shaft 125 under the force of tension spring 128 and the disk clamp unit 130 is separated from the turntable 16. The disk 20 so far placed on turntable 16 is now placed on the supporting members 137, 138 of the disk supporting arms 135, 136 and brought to a position shown in FIG. 11 in which the disk is kept floating over the turntable 16. As the motor 13 is driven further in reverse, the rear edges of the slots 113, 114, 115, 116 in the slide plates 103, 104 are abutted by stationary pins 109, 110, 111, 112 so that the slide plates 103, 104 are slid as one with leg pieces 101, 102 of the slide base 17, the slide balls 118 engaging in the recesses 119 in the base plate 7 as shown in FIG. 12. The slide base 17 made fast with the slide plates 103, 104 are driven towards the front side of the player proper 1. As the slide base 17 is driven in this manner towards the front side of the player proper 1, the first and second rotary arms 27, 39 and the third and fourth rotary arms 56, 57 are guided along respective guide grooves 85, 86 and shifted to the front side of the player proper 1 along with the slide base 17. As the supporting end shafts 26, 61 of the first and third rotary arms 27, 56 are facing to the guide grooves 85, 86, these rotary arms 27, 56 are introduced into rotation guide grooves 93, 94 under the force of the disk eject springs 91, 92. As the first and third rotary arms 27, 56 are rotated into rotation guide grooves 93, 94 under the force of the eject springs 91, 92, the disk 20, so far held loosely by the first to fourth rotary arms 27, 39, 56, 57 is ejected out of the insertion opening 6 of the player disk 1 as shown in FIG. 2 to complete the disk eject operation.

As the first rotary arm 27 has been rotated into rotation guide groove 93, the first changeover switch 36 is activated by switch operating element 37 on the rotary arm 27 to stop the operation of the driving electric motor 13.

During the sliding of the slide base 17 towards the front side of the player proper 1, the second and fourth rotary arms 39, 57 are also passed through the inlet region of the rotation guide grooves 93, 94 contiguous to the respective guide grooves 85, 86. However, the base ends of the supporting end shafts 41, 61 of the rotary arms 39, 57 are engaged in the steps 97, 98 at the forward corners of the slide base 17 so that the rotary arms 39, 57 may be moved to the front end of the guide grooves 85, 86 without entering these rotation guide grooves 93, 94.

In the above embodiment, position control means adapted for loosely supporting the disk 20 in cooperation with the first and second rotary members 23, 24 are constituted by a pair of rotary arms similar to the first and second rotary members 23, 24, that is, third and fourth rotary members 51, 52 including third and fourth rotary arms 56, 57 carried by the single supporting shaft 53, said rotary arms 56, 57 being guided along the guide groove 86 so as to be introduced into the rotation guide groove 94 for ejecting the disk 20. As modification, the position control means need only to control the direction and position of the movement of the optical disk 20 caused by the movement of the slide base 17 and thus may be designed as a control wall for controlling the direction of movement of the disk 20 through the range of movement of the disk 20.

Next, in the above embodiment, the cylindrical members 30, 42, 63, 64 are rotatably associated with supporting shafts 26, 41, 56, 61 associated in turn with the first to fourth rotary arms 27, 39, 56, 57, for assuring smooth insertion and ejection of the disk 20 and preventing damage to the disk 20. These cylindrical members 30, 42, 63, 64 may however be omitted when the supporting shafts 26, 41, 56, 61 are manufactured from abrasion resistant material or an abrasion resistant lining is provided to the peripheral surface of the supporting shafts.

What is claimed is:

1. In a disk player including a housing having an elongated opening extending laterally across a front wall thereof, and a rotary turntable laterally centered within said housing and spaced rearwardly from said front wall at a level below that of said elongated opening; a disk loading device for loading onto said turntable a record disk inserted into said opening, said device comprising a slide base mounted within said housing for sliding movement between a forward position and a rearward position;

first and second disk guiding means mounted on said slide base so as to be disposed adjacent opposite sides, respectively, of said opening in said forward position of the slide base, each of said first and second disk guiding means including forward and rearward guide elements spaced apart in the direction of said sliding movement of the slide base, means mounting said guide elements at said level of the elongated opening for individual movements in directions generally transverse to said direction of the sliding movement, and means biasing said forward guide elements substantially transversely toward each other and said rearward guide elements substantially transversely toward each other to initial positions in which transverse distances between said forward guide elements and between said rearward guide elements, respectively, are smaller than the record disk diameter, whereby, with said slide base in said forward position, insertion of a record disk through said opening to a stabilized position in respect to said slide base causes the edge of said record disk to spread apart said forward guide elements and said rearward guide elements, respectively, until said forward and rearward guide elements of said first disk guiding means and of said second disk guiding means, respectively, are engaged with said edge of the record disk at locations spaced forwardly and rearwardly in respect to a transversely extending diameter of the disk for stabilizing the position of said record disk relative to said slide base;

drive means operative when the inserted record disk has attained said stabilized position relative to the slide base for driving the latter to said rearward position in which the record disk in said stabilized position relative to the slide base is centered relative to said turntable;

disk support means mounted on said slide base and being movable relative thereto between a raised position engageable from below with the undersurface of the record disk inserted through said elongated opening and a lowered position below said level of the turntable; and means normally maintaining said disk support means in said raised position and displacing said disk support means to said lowered position during a final increment of movement of said slide base to said rearward position.

2. A disk player according to claim 1; in which said locations at which said forward and rearward guide elements engage the edge of the record disk in said stabilized position of the latter are symmetrically disposed in respect to said transversely extending diameter of the disk.

3. A disk player according to claim 1; in which said first and second disk guiding means further include means operative in response to displacement of said slide base from said forward position for holding said forward and rearward guide elements relatively spread apart against the force of said means biasing the guide elements.

4. A disk player according to claim 3; in which said means for holding said forward and rearward guide elements relatively spread apart includes, for each of said first and second disk guiding means, a guiding cam member and followers connected with the respective forward and rearward guide elements and engaging said guiding cam member, said guiding cam member having a major surface portion extending parallel with said direction of sliding movement of said base and branch portions extending in said generally transverse directions from said major surface portion and receiving said followers only in said forward position of the slide base.

5. A disk player according to claim 4; in which said branch portion of each said guiding cam member receiving said follower connected with the respective rearward guiding element extends transversely inward from said major surface portion so that, in said forward position of the slide base, said rearward guiding elements are biased closer together than said forward guiding elements for ejecting the record disk forwardly through said opening upon return of said slide base to said forward position.

6. A disk player according to claim 5; in which said means for biasing the guide elements includes first spring means arranged for relatively strongly urging said rearward guiding elements toward each other and second spring means arranged for relatively weakly urging said forward guiding elements toward each other.

7. A disk player according to claim 1; in which said drive means includes a motor energizeable for driving said slide base from said forward position to said rearward position, switch means actuable for energizing said motor, and switch actuating means connected with said rearward guiding element of one of said disk guiding means for actuating said switch means when the respective rearward guiding element attains a position corresponding to said stabilized position of the record disk.

8. A disk player according to claim 7; in which said drive means further includes second switch means actuable to halt the energizing of said motor, and means on said slide base for actuating said second switch means upon said final increment of movement of said slide base to said rearward position.

9. A disk player according to claim 1; in which said slide base includes a base member and slide plates mounted on said base member for limited movement relative to the latter in a direction parallel to said direction of sliding movement, and means for locking said slide plates to move with said base member except during said final increment of movement; and in which said drive means effects movement of said slide base through said slide plates to effect said limited movement of the latter relative to said base member during said final increment of movement, and said disk support means is displaced to said lowered position in response to said limited movement of said slide plates relative to said base member.

* * * * *